United States Patent [19]

Fourrey et al.

[11] Patent Number: 4,637,655
[45] Date of Patent: Jan. 20, 1987

[54] ADJUSTABLE HEAD-REST FOR A MOTOR VEHICLE SEAT OR THE LIKE

[75] Inventors: Francois Fourrey, Montbeliard; Pierre Caburet, Valentigney, both of France

[73] Assignee: Cycles Peugeot, Valentigney, France

[21] Appl. No.: 761,277

[22] Filed: Aug. 1, 1985

[30] Foreign Application Priority Data

Aug. 3, 1984 [FR] France .................... 84 12360

[51] Int. Cl.[4] ............................. A47C 1/10
[52] U.S. Cl. ........................ 297/410; 297/408; 297/409
[58] Field of Search ............ 297/410, 408, 409, 391

[56] References Cited
U.S. PATENT DOCUMENTS

| | | | |
|---|---|---|---|
| 3,592,508 | 7/1971 | Druseikis | 297/410 |
| 4,099,779 | 11/1978 | Goldner | 297/410 X |
| 4,466,662 | 8/1984 | McDonald et al. | 297/410 X |

FOREIGN PATENT DOCUMENTS 3048688 10/1981 Fed. Rep. of Germany.

*Primary Examiner*—James T. McCall
*Attorney, Agent, or Firm*—Sughrue, Mion, Zinn, Macpeak and Seas

[57] ABSTRACT

This head-rest comprises two semi-cases (1 and 2) which are pivoted together in their upper part (at 4). The front semi-case (1) carries a frame (12) for a padding cushion. The rear semi-case (2) is pivotally mounted in a fixed mount (14–18) rigid with two fixing tubes 20 in sleeves (56) mounted on the seat. One of the tubes (20) carries a screw-and-nut system (28–30) connected to the front lower end of the rear semi-case and controlling the adjustment in height of the bearing point of the head of the user, while the other tube (20) carries a screw-and-nut system connected to the upper part of the rear semi-case 1 for adjusting the forward and rearward setting position of the support point of the head of the user.

10 Claims, 6 Drawing Figures

ADJUSTABLE HEAD-REST FOR A MOTOR VEHICLE SEAT OR THE LIKE

Head-rests, and in particular head-rests for motor vehicle seats, are part of accessories which contribute as a rule to the comfort and safety of the occupants of the vehicle. Unfortunately, the position of the head-rest very often does not correspond to the morphology of this occupant. In some cases, the latter is hindered by a head-rest placed excessively low down or projecting excessively from the seat back, while, in other cases, the occupant cannot use a head-rest which is too high and too much to the rear.

An object of the present invention is to overcome these drawbacks by providing an easily adjustable head-rest whereby it is possible to vary as desired the point of support of the head in height and depth.

The invention therefore provides an adjustable head-rest comprising two elements pivoted together in their upper part, a first of said element being pivotable in its lower part on a fixed mount while the second of said elements carries the frame of a padding cushion, and means for controlling the pivoting of each of said elements, wherein said first and second elements comprise a first semi-case and a second semi-case, each of which is connected by a lateral wing to a device controlling the pivoting, the first semi-case being connected to its control device in its lower part while the second semi-case is connected to its control device in its upper part, so that the pivoting of the first semi-case shifts the cushion frame while maintaining it parallel to itself in the horizontal direction, while the pivoting of the second semi-case solely shifts the frame and vertically adjusts the position of the head support point.

The pivoting of either or even of both semi-cases thus enables the position of the head-rest to be adapted not only to the height of the user of the seat but also to the position that the user finds to be the most comfortable.

According to a preferred embodiment, the pivoting devices comprise screw-and-nut systems connected to remote-control cables.

The head-rest may be mounted in a permanent manner or may be removable and connected to the control cable by means of a socket connection.

The following description of an embodiment, given by way of a non-limiting example with reference to the accompanying drawings, will show the features and advantages of the invention.

Figure 1:
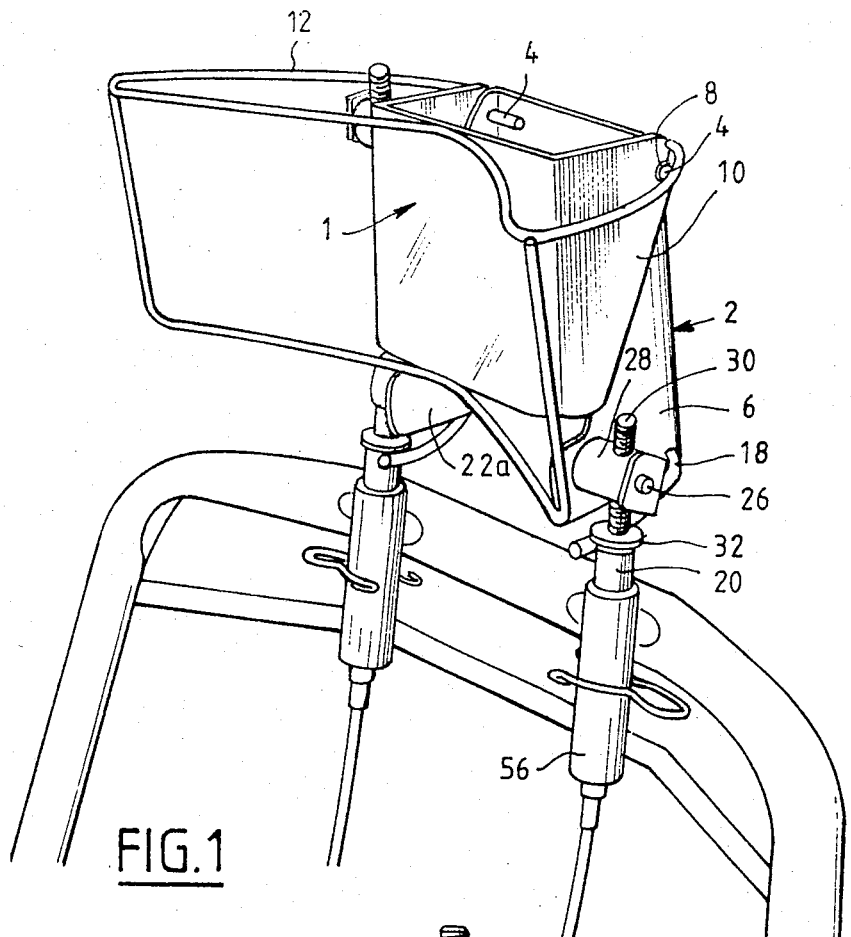
FIG. 1 is a perpective view of a head-rest placed on the upper part of the seat back of a seat, the padding having been removed.

As shown in the drawings, the head-rest according to the invention comprises two semi-cases 1 and 2 which have U-shaped sections and are fitted one inside the other. These semi-cases are pivoted together in their upper part by means of pivot pins 4 which extend through their lateral wings but are fixed in the wings of one of the semi-cases, for example the wings 6 of the rear semi-case 2, while they freely extend through openings 8 provided in the lateral wings 10 of the front semi-case 1.

The front semi-case 1 carries a frame 12 for supporting a padding forming the cushion of the head-rest. The rear semi-case 2 extends below the front semi-case 1 and is pivotally mounted on a fixing mount on the seat back of the seat. This mount comprises a rod 14 parallel to the upper pivot axis of the semi-cases and extending through the lateral wings 6 of the semi-case 2 in the vicinity of the bottom 16 of the latter and extended on each side of the semi-case 2 by two arms 18 fixed to tubes 20 mounted on the seatback.

Figure 4:
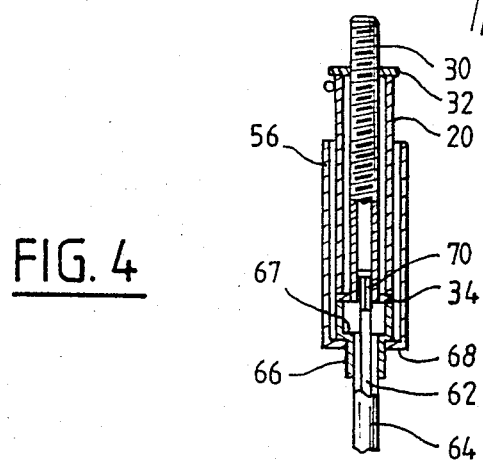
FIG. 4 is a sectional view taken on line 4—4 of FIG. 2.
Figure 2:
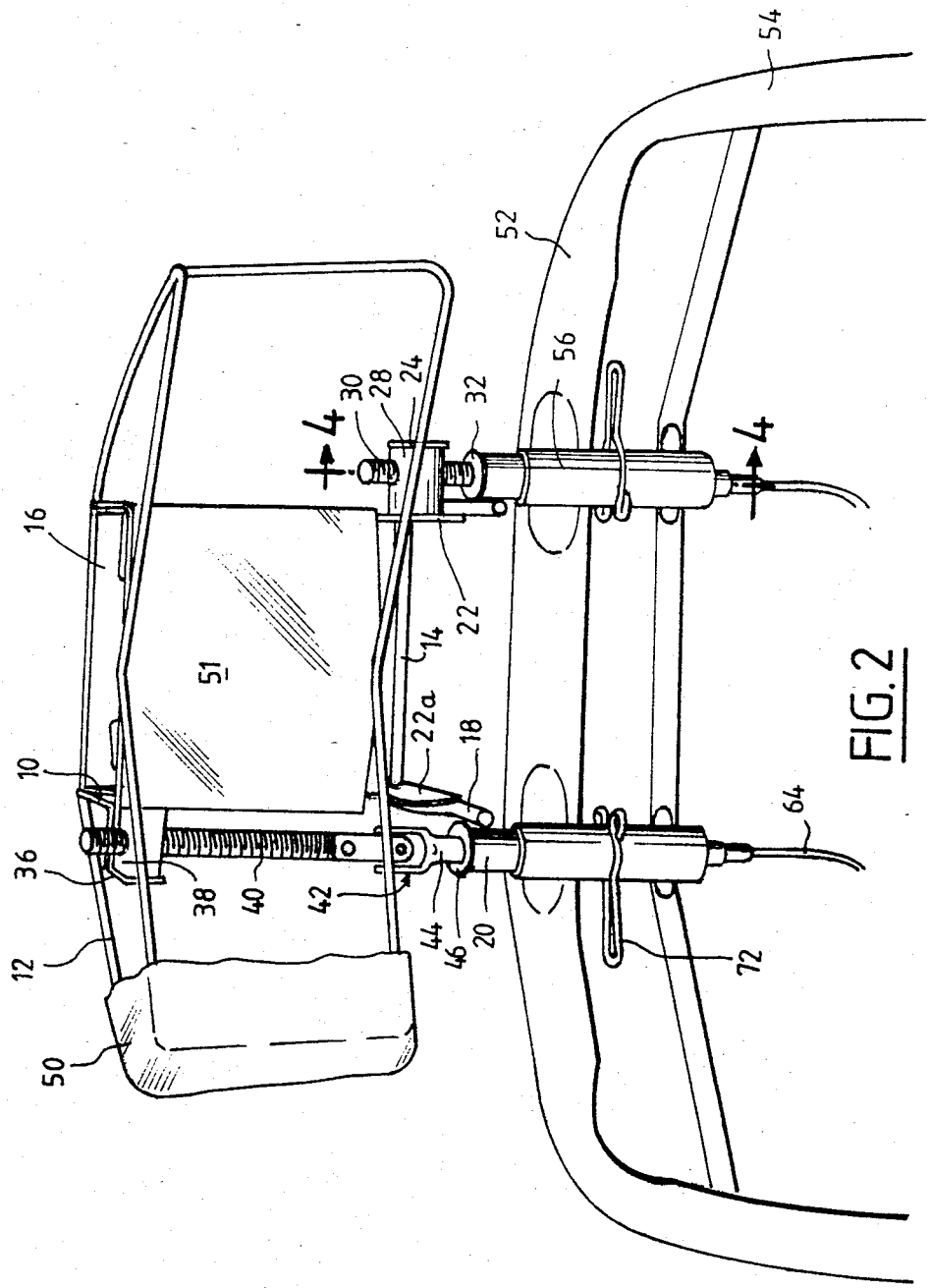
FIG. 2 is a front elevational view of this head-rest.

Each of the wings 6 of the semi-case 2 is extended below the semi-case 1 by a tab 22–22a. One of these tabs, namely the tab 22 in the illustrated embodiment, constitutes with a bent member 24 a yoke supporting a pin 26 rigid with a nut 28 through which a screw 30 extends. The screw 30 is extended inside the tube 20. It is rigid, on one hand, with a flange 32 and, on the other hand, with an end member 34 which prevents its axial displacement with respect to this tube (FIG. 4).

Figure 5:
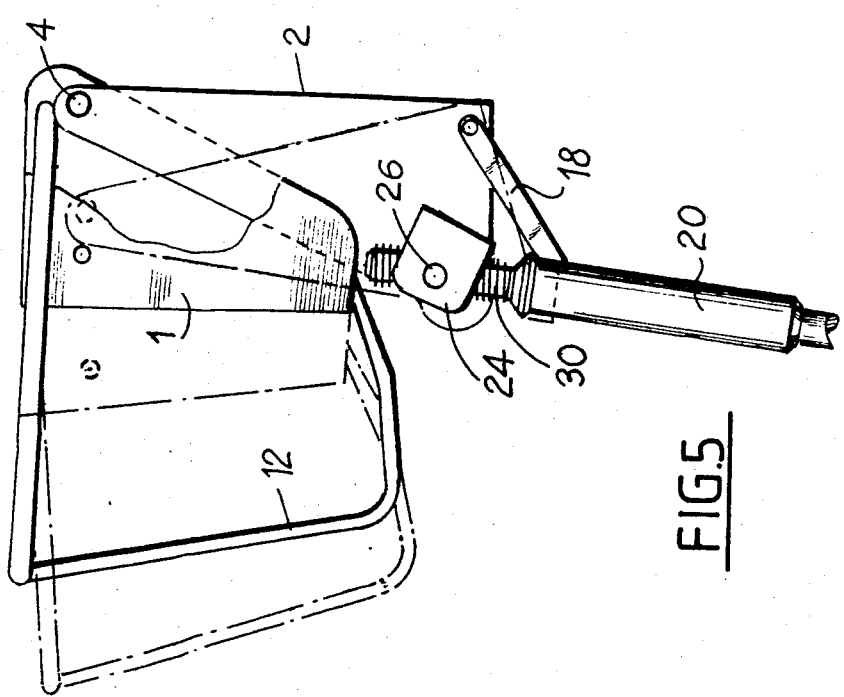
FIG. 5 is a view of the right side of the head-rest shown in FIG. 1.

It will be understood that the elements 24 to 30 constitute a control device adjusting the pivotal position of the semi-case relative to the mount 14, 18, 20 since any rotation of the screw 30 which is axially immobilized, causes the axial displacement of the nut 28 and consequently the pivoting of the semi-case 2 about the rod 14. Depending on the direction of rotation of the screw 30, the tab 22, and consequently the whole of the semi-case 2, is pivoted upwardly and moved away from the mounting tubes 20 or this tab 22 and the whole of the semi-case 2 are moved toward the fixing tubes 20. This displacement of course also displaces the semi-case 1 carrying the cushion unit 12, as can be clearly seen in FIG. 5 which shows respectively in full lines and in dot-dash lines two positions of the head-rest. The bearing point of the head of the user is therefore shifted forwardly or rearwardly depending on the direction of rotation of the screw 30.

On the opposite side of the head-rest, the wing 10 of the semi-case 1 constitutes in its upper part with a bent member 36 a second yoke constituting connecting means in which is mounted a nut 38 through which a screw 40 extends. This screw 40 is connected by a universal joint 42 to a rod 44 axially mounted in one of the two fixing tubes 20 of the mount. The rod 44 and the screw 30 are axially immobilized relative to the tube 20 in the median part of the latter by a hairpin-shaped member 72 and the rod 44 abuts against an end member similar to the end member 34. The elements 36, 38, 40, 42 and 44 constitute a control device for adjusting the angular position of the semi-case 1 about the pivot pins 4 relative to the mount 20,20.

Figure 6:
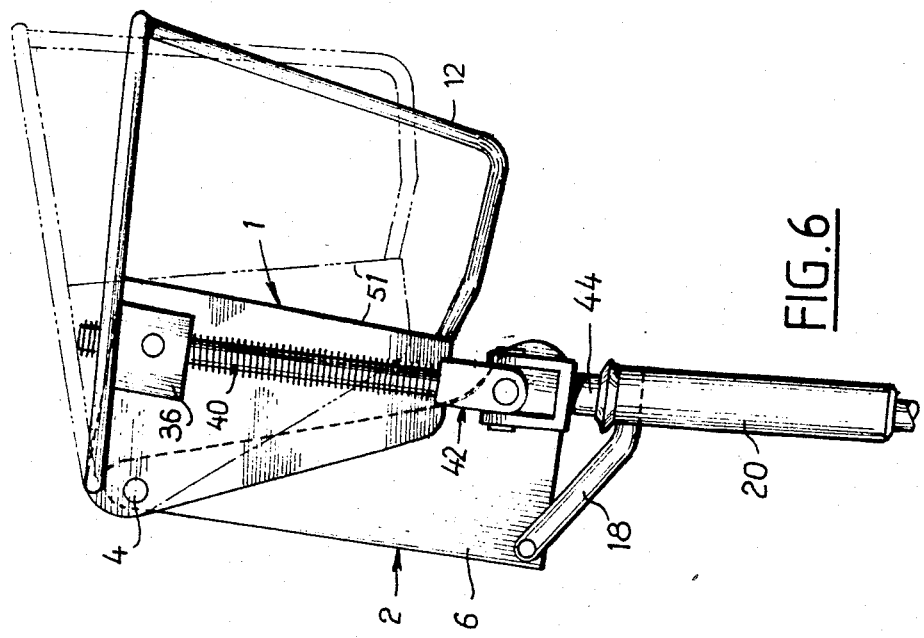
FIG. 6 is a view of the left side of this head-rest.

The rotation of the rod 44 causes the rotation of the screw 40 and axially displaces the nut 38 and pivots the upper part of the semi-case 1 about the pins 4. This pivoting modifies the inclination of the rear end wall 51 of this semi-case and consequently modifies the distance between the fixed mount and the front side of the frame 12, or more precisely of the padding 50 of the head-rest. Depending on the direction of rotation of the screw 40, this front side moves away from the semi-case 2 and from the fixed mount formed by the rod 14 and the fixing tubes 20, or moves toward them, for example between the two positions indicated in full lines and dot-dash lines respectively in FIG. 6. In the course of such a movement, the bearing point of the head of the user may be moved forward or rearward the desired distance. The combination of the two adjustments of the semi-cases thus enables the head-rest to be given the position which exactly corresponds to the morphology of the user.

Figure 3:
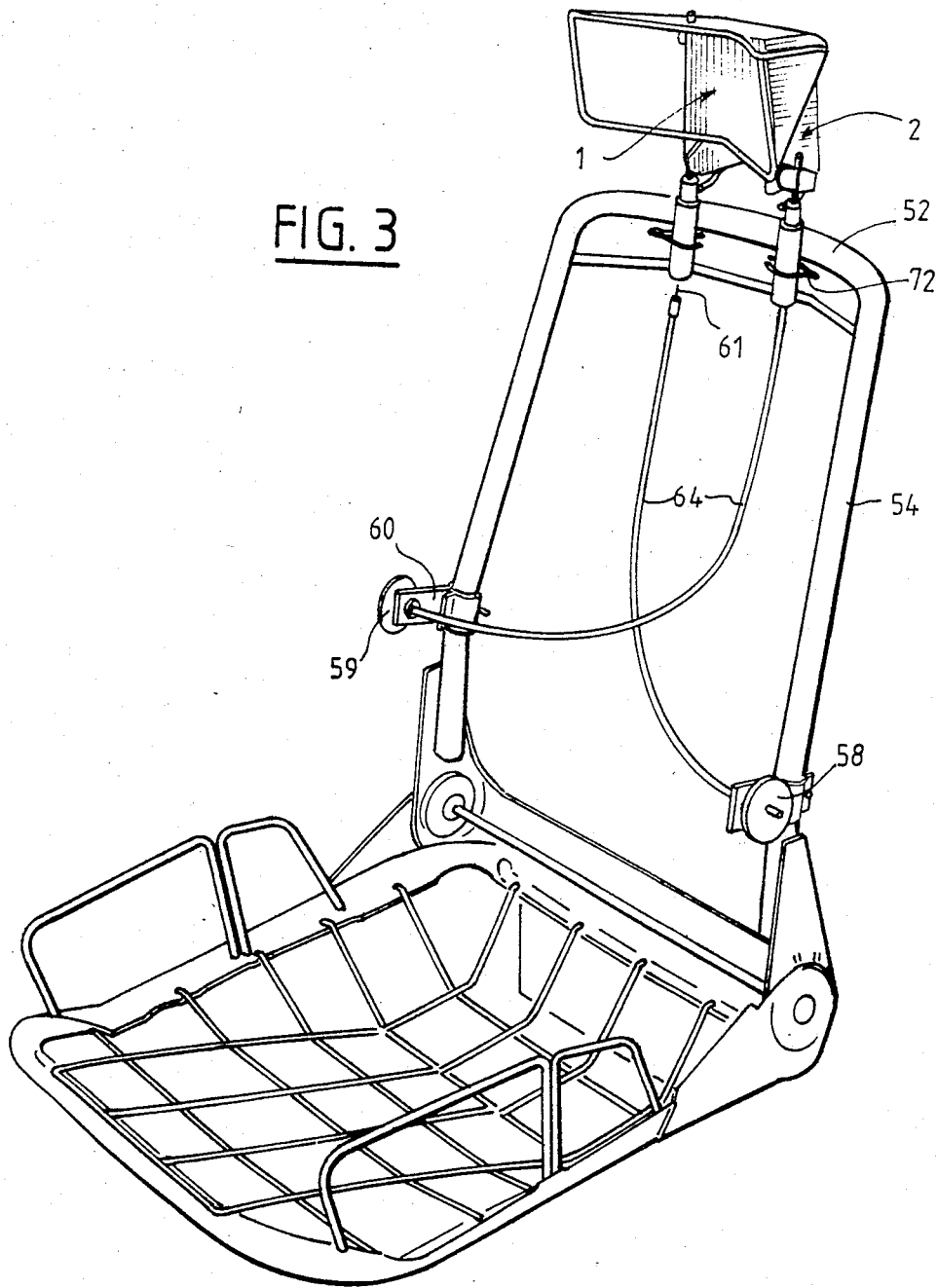
FIG. 3 is a perspective view of an assembly comprising a seat provided with a head-rest according to the invention, the padding cushions having been removed in order to render the drawing more clear.

This head-rest may be removable permanently mounted on the upper bar 52 of the frame 54 of the seat back of a seat, for example a motor vehicle seat. In either case, in use, the fixing tubes are fitted in sleeves 56 fixed to the bar 52 in the conventional manner. Two control cables are preferably mounted between the sleeves 56 and two knurled knobs respectively 58 and 59 rotatively mounted on the two vertical opposed members of the frame 54 through brackets 60 (FIG. 3).

Each of the cables 61 and 62 is protected by a sheath 64 which has one end fixed to the corresponding bracket 60 and its other end inserted in the sleeve 56 and fixed inside the latter by an end member 66 having a shoulder 67 which abuts against the bottom 68 of this sleeve. The cable terminates in a head 70 which has a quadrangular and preferably square sectional shape which fits in an opening of corresponding shape in the end member 34, which connects it to the screw 30 or the rod 44 so as to rotate therewith. With this arrangement, each of the screws 40 and 30 is connected to rotate with one of these control cables 61 and 62 so that the user may easily adjust the head-rest by merely rotating the knurled knob 58 and/or 59 and obtain the most comfortable position for him.

The screw 30 is coupled to the control cable 62 very simply by merely fitting the tube 20 in the corresponding sleeve 56. As shown in FIG. 4, in the course of this insertion, the end member 34 abuts against the upper end of the end member 66 while the head 70 enters this end member 34 and the lower part of the screw 30. The screw 40 is connected in the same manner, since the rod 44 has, in the same way as the screw 30, an end member 34 in which the corresponding square head of the cable 61 can be fitted.

Preferably, a hairpin-shaped member 72 is fitted around each of the sleeves 56 in a slot in the sleeve which corresponds to a slot in the fixing tube 20 and simultaneously grips these two elements and prevents any upward movement of the tube 20, and consequently of the head-rest, with respect to the sleeve 56. Thus any risk of separation between the square head 70 of the cable 61 or 62 and the corresponding end member 34 is avoided.

The head-rest can consequently be used in a particularly sure manner, it being easily adaptable to the seat back of a seat and providng at all times the user with an effective support reducing fatigue resulting from a prolonged seated position.

We claim:

1. An adjustable head-rest for a seat, comprising a fixed mount for fixing on the seat, a first semi-case and a second semi-case, pivot means pivotally interconnecting the two semi-cases in upper parts of the two semi-cases for relative pivotal movement about a first pivot axis, the first semi-case being pivotally mounted in a lower part thereof on the mount to pivot relative to the mount about a second pivot axis, a frame of a padding cushion for supporting a user's head and carried by the second semi-case, a first control device and a second control device mounted respectively in a first position and a second position directly on said mount for respectively adjusting angular positions of the first semi-case and second semi-case about said pivot axes relative to said mount, each semi-case having a lateral wing, first connecting means connecting the first control device to the wing of the first semi-case and second connecting means connecting the second control device to the wing of the second semi-case in an upper part of the wing of the second semi-case in a position adjacent to but spaced from said first pivot axis, said second position of the mounting of the second control device on said mount being spaced from said second pivot axis, and said first and second pivot axes, said second connecting means and said second position forming substantially a deformable parallelogram structure, the second control device and said second connecting means being such as to allow pivotal movements of said semi-cases relative to said mount about said pivot axes when adjusting their angular positions relative to said mount by means of said control devices but maintaining said second connecting means at a fixed distance from the mount determined by the adjustment effected by the second control device so that the pivoting of the first semi-case about said first pivot axis shifts the cushion frame in a substantially horizontal direction while maintaining the cushion frame substantially in the same angular position relative to the mount and the pivoting of the second semi-case by means of the second control device for adjusting purposes does not affect the position of the first semi-case relative to the mount and adjusts the position of the cushion frame in a substantially vertical direction relative to the mount.

2. A head-rest according to claim 1, wherein the first semi-case is a rear semi-case and said first pivot axis and said second axis are parallel to each other and contained in a plane substantially parallel to and in the vicinity of a rear end wall of the first semi-case.

3. A head-rest according to claim 1, wherein the first semi-case is a rear semi-case and has two lateral wings through the lower part of which wings the fixed mount extends, one of said wings being connected in a front part thereof to the first control device.

4. A head-rest according to claim 1, wherein the two semi-cases have substantially U-shaped sections and are fitted one inside the other, the first semi-case being a rear semi-case and extending below the second semi-case.

5. A head-rest according to claim 1, wherein the second semi-case is a front semi-case having two spaced-apart lateral wings and is laterally connected in an upper part of one of said lateral wings to the second control device and said pivot means constituting said first pivot axis is a pin extending through an end poriton of said lateral wings.

6. A head-rest according to claim 1, wherein each of said control devices comprises a nut carried by the respective semi-case, a screw mounted in said mount, a control member connected to the screw for rotating the screw relative to said mount, the screw being axially immobilized relative to said mount and extending through and screwthreadedly engaged with the nut.

7. A head-rest according to claim 6, comprising two control cables and a socket connection connecting each of the control cables to a respective one of said screw.

8. A head-rest according to claim 7, which is removable.

9. A head-rest according to claim 1, wherein said mount includes two fixing tubes and the first semi-case is a rear semi-case and a rod forming said second pivot axis of the pivotal connection of the first semicase is mounted on the fixing tubes.

10. A head-rest according to claim 6, wherein said mount includes two fixing tubes and the second semi-case is a front semi-case and the screw controlling the pivoting of the front semi-case is connected to one of said fixing tubes through a universal joint and a rod axially immobilized in said one fixing tube, said universal joint being at said second position of the mounting of the second control device on said mount.

* * * * *